July 21, 1936.   D. B. GISH   2,048,116

HOSE COUPLING

Filed Feb. 21, 1935

INVENTOR.
Daniel B. Gish.
BY Walter C. Ron.
ATTORNEY.

Patented July 21, 1936

2,048,116

UNITED STATES PATENT OFFICE 2,048,116

HOSE COUPLING

Daniel B. Gish, West Springfield, Mass.

Application February 21, 1935, Serial No. 7,543

1 Claim. (Cl. 285—84)

This invention relates to improvements in hose couplings and combined couplings and hose and in methods of securing and assembling the hose and coupling, and this application is a continuation in part of application Serial No. 743,688, filed September 12, 1934, now Patent No. 1,985,494 of December 25, 1934.

The principal objects of this invention are directed to the provision of a novel coupling and method of securing the same to a hose and according to special features of the invention the coupling is not only simple in form so as to be economical to manufacture but it is of such a nature that it may be readily and quickly assembled and secured to a hose.

The coupling of this invention consists of separate parts such as a body and a tail-piece which are so constructed and arranged that they may be readily assembled with the hose and then the body is subjected to radial pressure so as to simultaneously lock the tail-piece to the coupling and secure the hose to the locked together body and tail-piece.

With the ever increasing pressures employed in connection with greasing apparatus where hose is used, the coupling must be secured to the hose in such a way that it is not likely to be blown from the hose under the extreme pressures and be capable of withstanding extreme pressures. The hose referred to is usually provided with reinforcement in its wall or on its inner bore and it is for hose of this type that the coupling of the invention is particularly adapted.

Various other novel features and advantages of the invention will be hereinafter more fully referred to in connection with the accompanying description of the invention in the form at present preferred, reference being had to the accompanying drawing, wherein.

Figure 1:
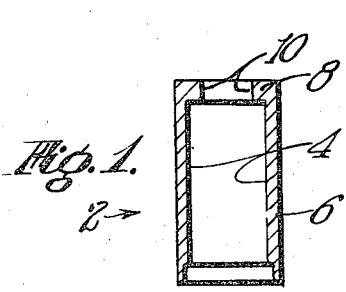
Fig. 1 is a sectional elevational view through a body forming one part of the coupling.

Referring now to the drawing more in detail, the invention will be fully described.

A coupling body 2 is shown in Fig. 1 which has an interior bore 4 which provides an annular skirt or wall 6 connected to an end wall 8. The end wall is provided with a socket 10 for receiving a part of a tail-piece as will be described.

The body 2 is preferably made of some metallic material whereby the wall or skirt thereof may be compressed or squeezed inwardly to reduce its diameter and so that the end wall portion 8 of the body may be deformed to cause a part of the tail-piece to be locked or embraced by the socket bore 10.

Figure 2:
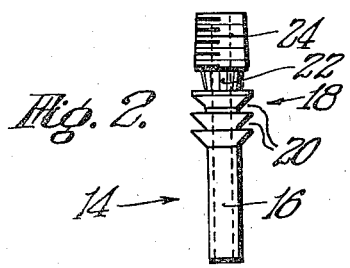
Fig. 2 is a side elevational view of a tail-piece forming another part of the coupling.

A tail-piece 14 is shown in Fig. 2 which is hollow as shown. This has a stem 16 at its lower end and an enlarged gripping portion 18 thereabove. This portion 18 is preferably provided with grooves 20 for interlocking with the reinforcement at the inner side of the bore of a hose.

A neck portion 22 of the tail-piece extends upwardly from the enlarged portion thereof and in the form of the invention shown in Fig. 2 there is a male threaded end portion 24 on the upper end of the tail-piece above the neck 22.

The socket bore 10 of the body is of such diameter as to allow the threaded end 24 of the tail-piece to pass therethrough. Thus, it will be seen, the neck portion 22 of the tail-piece may be disposed in the socket bore 10 when the parts of the coupling are assembled.

Figure 3:
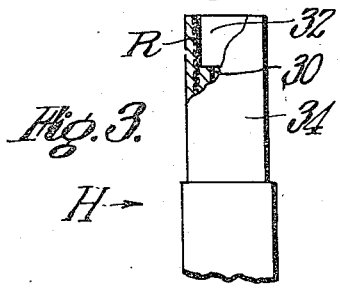
Fig. 3 is an elevational view, partly in section, showing the end portion of a hose to explain the invention.

An end portion of a hose is shown at H in Fig. 3. This hose has a central bore 30 and is of the type made with reinforcement R in its wall or the reinforcement may be employed as a lining for the said bore 30. The reinforcement may consist of windings or braidings of wire or metallic members interlocked to strengthen the hose.

The hose is usually made of some composition including rubber or the like so as to be flexible and somewhat compressible and the outside thereof at its endmost portion is scarfed or ground off so that it will readily slip into the bore of the body. The scarfing makes the hose of some uniform diameter to properly fit in the bore.

Where the reinforcement R is in the wall of the hose the end of the bore of the hose is enlarged at 32 to expose the reinforcement and so that the enlarged part of the tail-piece may be inserted therein and the reinforcement contacted with the grooves of the tail-piece. Where the reinforcement more or less lines the bore of the hose, there may be no material to be removed from the bore to expose the said reinforcement.

In assembling the coupling parts and hose, the stem 16 of the tail-piece is inserted in the bore 30 of the hose H with the enlarged part 18 of the tail-piece in the enlarged bore 32 of the hose so that the grooves of the tail-piece and reinforcement may be interlocked. Then the tail-piece and end of the hose are inserted in the body so that the scarfed end of the hose is in the bore of the body with the neck 22 of the tail-piece in the socket 16 and the threaded portion extending therebeyond.

When so assembled the body is subjected to pressure so as to compress or squeeze its walls and reduce the diameter of the body. This causes the wall of the hose to be squeezed between the wall of the body and tail-piece and interlocks the reinforcement of the hose with the grooved part of the tail-piece. The squeezing also causes the end wall 8 of the body to be distorted, or the metal thereof is caused to flow, so that the end wall material is forced against and around the neck of the tail-piece. In this way the end wall of the hose is securely locked to the tail-piece while the hose is locked between the wall of the body and the tail-piece with the reinforcement interlocked with the grooves of the tail-piece.

It will be noted that there is a substantial amount of the material of the wall of the hose outside the enlarged part of the tail-piece. This is desirable because should pressure leak upwardly alongside the tail-piece past the reinforcement, the material of the wall of the hose outside the reinforcement and adjacent the inner side of the wall of the body serves as a seal to prevent pressure leaking downwardly between the tail-piece and wall of the body.

Figure 5:
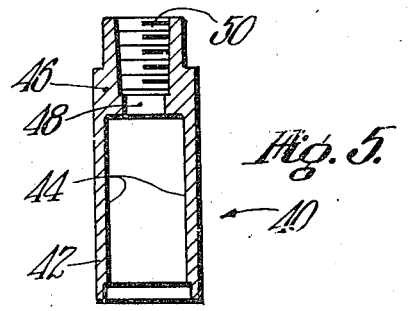
Fig. 5 is a view similar to Fig. 1 showing a modified form of the invention.
Figure 6:
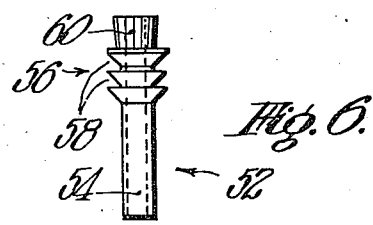
Fig. 6 is a view similar to Fig. 2 showing a modified form of tail-piece.
Figure 7:
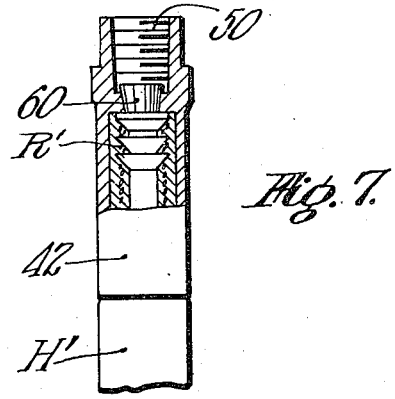
Fig. 7 is a view similar to Fig. 4 showing the parts illustrated in Figs. 5 and 6 assembled with an end portion of a hose.
Figure 4:
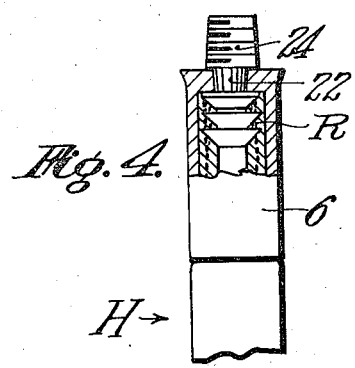
Fig. 4 is a partial side elevational and sectional view showing the coupling and hose secured together in assembled relation.

The modification of the invention shown in Figs. 5, 6 and 7 is similar to that already described. The form already described provides a hose having a coupling secured thereto which has a male connecting thread such as 24. The form of the invention now to be described provides a female coupling thread.

A body is represented at 40 and this has a bore 44 to provide an annular skirt or wall 42. The bore is adapted to receive the end of the hose and an end wall 46 has a socket 48 and a tapped female bore 50.

A tail-piece 52 in this case has a stem 54 and an enlarged part 56 provided with grooves 58. A neck 60, similar in important respects to that of tail-piece 14, extends upwardly from the part 56 as shown.

In this form of the invention the parts are assembled as follows. The tail-piece 52 is inserted in a hose H', which is prepared as explained with reference to Fig. 3, and the assembled end of the hose H' and tail-piece 52 are inserted in the body 40 as shown in Fig. 7 with the neck 60 of the tail-piece disposed in the socket bore 48.

The wall of the body is compressed or squeezed as in the former case so that the neck 60 of the tail-piece is locked to the body by being gripped by the end wall thereof while the wall of the hose and reinforcement are locked to the body as before.

In both cases the neck of the stem is preferably tapered as shown so that when it is locked in the body it is capable of resisting endwise pulling strains. This is an important feature because hose and couplings of this type are not only subjected to extremely high pressures, say to the order of 20,000 pounds or more per square inch but while under these pressures there are more or less pulling strains applied to the hose which tends to cause the coupling to be blown from the hose. By securely locking the tail-piece to the body and then locking the hose between the tail-piece and body with the reinforcement of the hose interlocked with the grooves of the tail-piece the construction is capable of withstanding extremely high pressures and the pulling strains as well.

The coupling in general is compressed to a more or less uniform diameter so that, by means of the tapering part of the tail-piece, the part of the hose between the tapering part and the skirt of the coupling is embraced with gradually increasing compression. That is to say, the compression along the tail-piece over the part thereof which is tapered is such that the hose wall is squeezed to a degree which gradually increases upwardly along the tapering portion until, at the point where the projections and grooves are locked with the reinforcement, there is the maximum locking effect.

While I have described the invention in great detail, it is not desired to be limited thereto since many changes and modifications may be made therein without departing from the spirit and scope of the invention. What it is desired to claim and secure by Letters Patent of the United States is:

In combination with a hose having a bore, a substantially tubular coupling body member including a lower main part embracing an endmost portion of the hose and an upper end part integral with the main part and of less length than the main part, the bore of the end part being of substantially uniform diameter and of less diameter than the bore of the main part so as to provide an internal shoulder therebetween, the diameter of the said bore of the main part being also substantially uniform, and a separate hollow tail-piece member including a lower stem and an intermediate enlarged part both extending into the bore of the said endmost portion of the hose and an upper neck portion extending through said bore of the end part of the body member, said intermediate part of the tail-piece member being provided with alternate grooves and ridges which engage the hose, said tail-piece member being of less length than said body member, and said body member being reduced in diameter so that the said endmost portion of the hose is squeezed between said main part thereof and said stem and intermediate part of the tail-piece member and the upper neck portion of the tail-piece member is squeezed and locked in place by said upper end part of the body member.

DANIEL B. GISH.